June 16, 1931.  J. F. ADAMS  1,809,815
SAFETY DEVICE FOR MOTION PICTURE PROJECTING MACHINES
Filed Oct. 12, 1927   4 Sheets-Sheet 1

WITNESSES:

INVENTOR:
John Francis Adams,
BY
ATTORNEY.

June 16, 1931.  J. F. ADAMS  1,809,815
SAFETY DEVICE FOR MOTION PICTURE PROJECTING MACHINES
Filed Oct. 12, 1927  4 Sheets-Sheet 2
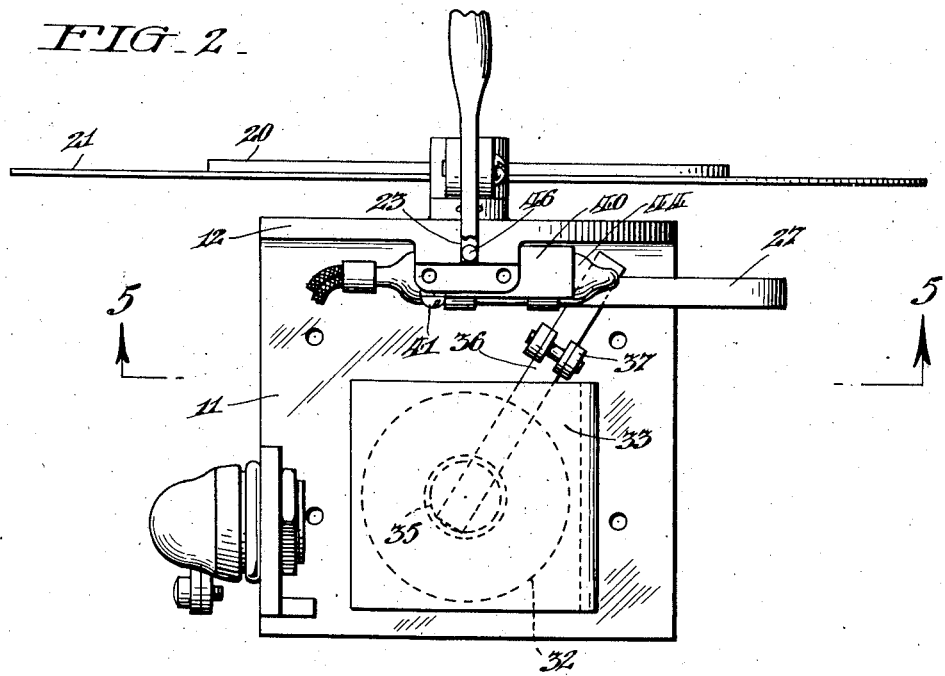
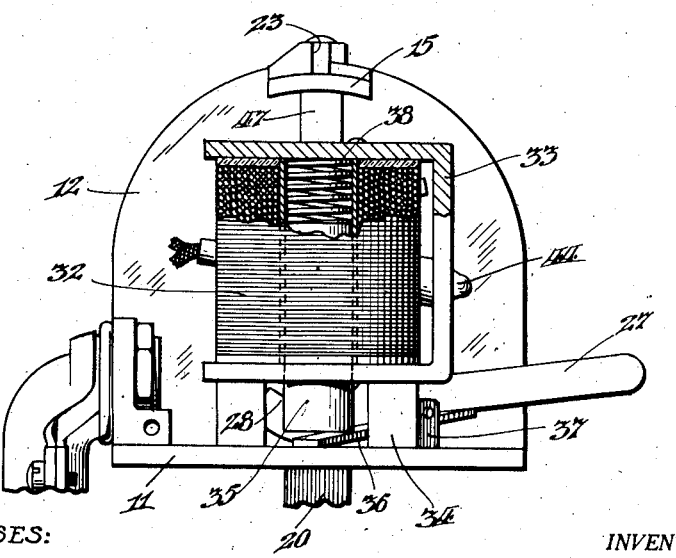
WITNESSES:
INVENTOR:
John Francis Adams,
BY
ATTORNEY.

June 16, 1931. J. F. ADAMS 1,809,815
SAFETY DEVICE FOR MOTION PICTURE PROJECTING MACHINES
Filed Oct. 12, 1927 4 Sheets-Sheet 3

WITNESSES:

INVENTOR:
John Francis Adams,
BY
ATTORNEY

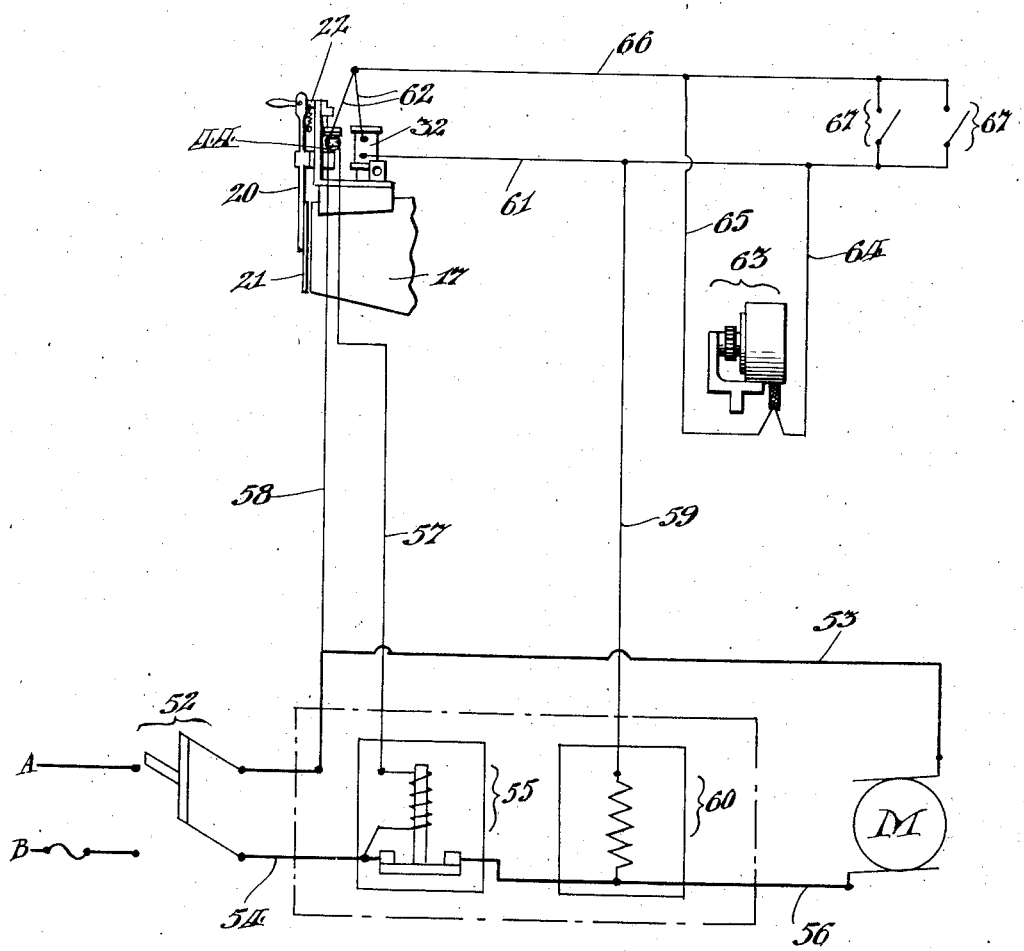

Patented June 16, 1931

1,809,815

UNITED STATES PATENT OFFICE

JOHN FRANCIS ADAMS, OF PHILADELPHIA, PENNSYLVANIA, ASSIGNOR TO SENTRY SAFETY CONTROL CORPORATION, OF PHILADELPHIA, PENNSYLVANIA

SAFETY DEVICE FOR MOTION PICTURE PROJECTING MACHINES

Application filed October 12, 1927. Serial No. 225,808.

My invention relates to automatic control apparatus for motion picture projecting machines, and more particularly to a main unit or safety device forming a part of such apparatus.

In the operation of motion picture projecting machines, the film will be ignited by the intense heat if it fails to move with sufficient rapidity through the path of the rays of light from the lamp and this is, perhaps, the most prolific source of fire in picture theaters. If the film fails to move through the machine at or above a certain rate of speed, the images are not projected upon the screen with sufficient rapidity to produce the illusion of continuous movement.

The principal object of my invention is to provide an improved safety device adapted to intercept the rays of light passing through the film and to stop the machine whenever the film breaks or fails to move through the machine at or above a predetermined rate of speed; the device being actuated by a system of switches adapted to be opened or closed upon the occurrence of certain events.

When the machine is started, the motor requires a short time in which to accelerate to the speed required for proper projection, and another object of my invention is to provide a device having a dowser, for obstructing the rays of light passing through the film, which cannot be moved from light obstructing position until the motor has acquired the requisite speed.

Another object of my invention is to provide a safety device which is compactly built and which may be mounted upon any projecting machine.

Still another object is to provide a safety device whose parts are readily accessible for inspection and which is so simply designed that there is little likelihood of its getting out of order.

According to the invention, the safety devices comprises a dowser unit which has a shaft upon which a dowser is mounted, said dowser being adapted to be held out of light obstructing position by a trigger which cooperates with a notch in a collar secured on said shaft, an electromagnet having a plunger adapted to be urged downward by a spring mounted in said magnet and which, when urged downward, will strike against one end of a pivoted lever, thereby raising the other end of said lever and causing it to strike against said trigger, which action will withdraw the same from the said notch in the collar and permit the dowser to fall by gravity.

The dowser unit is also provided with a tiltable switch in the motor circuit and which is normally held in a position to hold said circuit closed, an actuator which, upon the closing of the dowser, is actuated by the latch on the dowser handle for tilting said switch downward in order to open the motor circuit. The dowser is adapted to be opened manually and is prevented from being opened from light obstructing position until the motor has attained sufficient speed to operate a centrifugal switch and thereby energize the magnet, whereupon the trigger 27 will fall by gravity and release the collar 30 to permit the dowser to be raised out of light obstructing position.

The drawings illustrate an embodiment of the invention and the views therein are as follows:—

Figure 1:
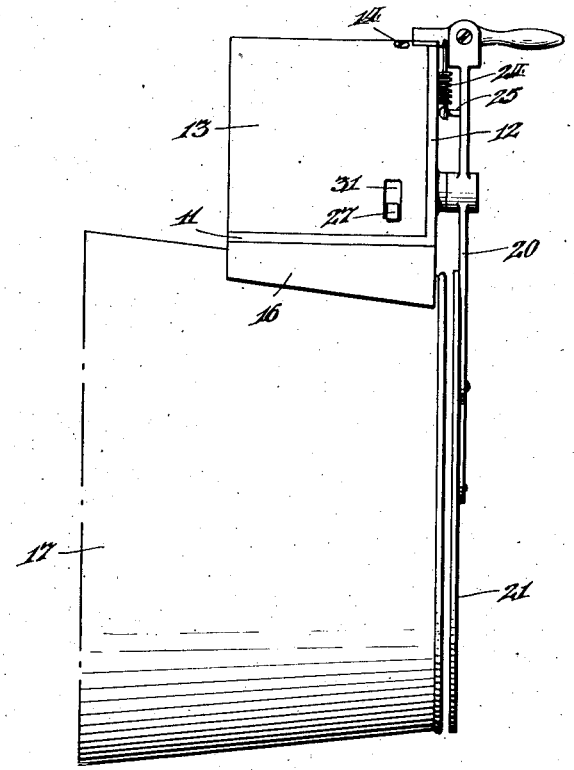
Figure 1 is a side view of a safety device showing same mounted upon a fragment of the lamp housing cone of a motion picture projecting machine, Figure 2 a top plan view of the device shown in Figure 1 with the casing removed, and Figure 3 a rear view thereof, certain parts being broken away.
Figure 6:
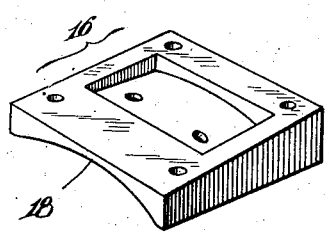
Figure 5:
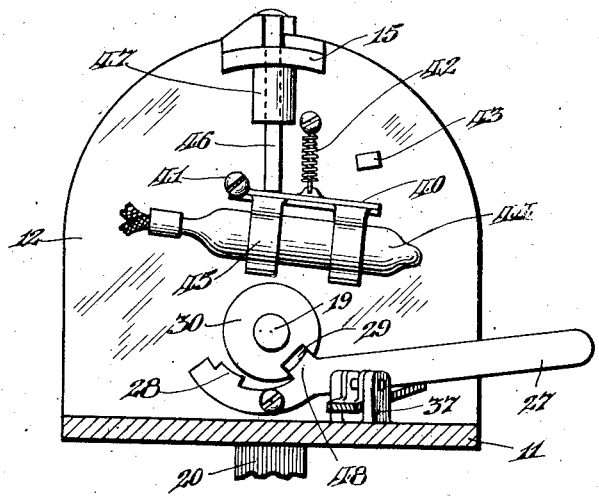
Figure 4:
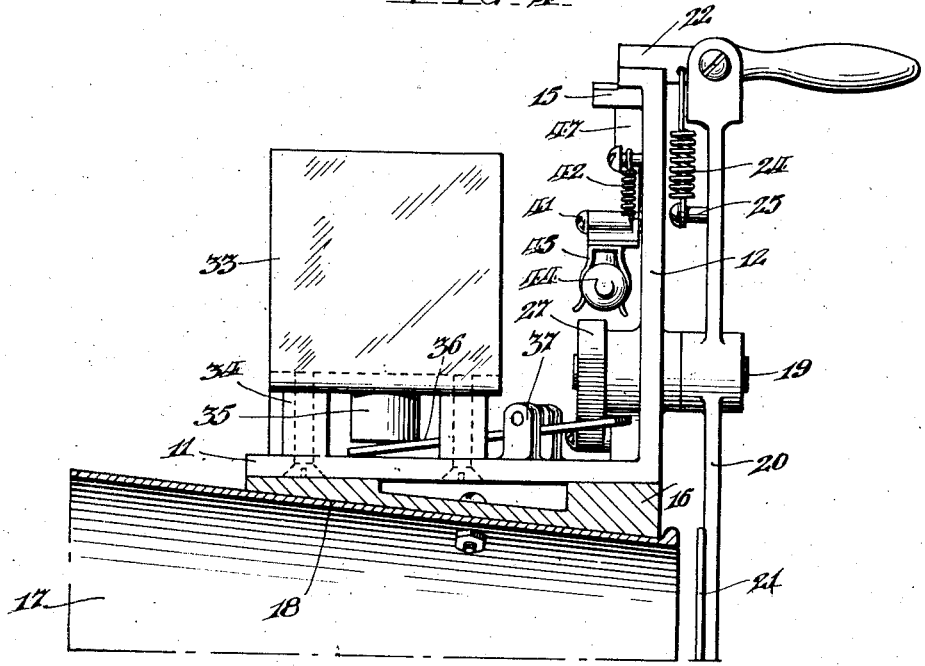
Figure 4 is a side view of the safety device shown in Figure 1 with the casing cover removed and the fragment of cone and adaptor shown in section.

Figure 5 a transverse sectional view on line 5—5 on Figure 2, certain parts being broken away, and Figure 6 a perspective view of an adaptor for supporting the device upon the cone of a projecting machine.

Figure 7 is a wiring diagram or schematic drawing showing the electrical relation of the motor circuit of a motion picture projecting machine to my device and to other elements forming a complete automatic control apparatus.

Referring now more in detail to the drawings, I have shown my safety device provided with a casing consisting of a base 11 and a front 12 against which a cover 13 is secured by screws 14 threaded into a lug 15 formed on front 12; the top of cover 13 being arcuate to conform to the shape of front 12 and its rear wall being perpendicular and aligning with the rear edge of base 11. An adaptor 16 is bolted to the bottom of base 11 and adapted to be bolted on the end of the cone 17 of a motion picture projecting machine; the under side 18 of the adaptor being curved to conform to the contour of a certain size of cone so that my safety device may be mounted upon any projecting machine by merely substituting the proper adaptor for the size of cone carried by that machine.

A shaft 19 is journaled in front 12 and has a dowser 20 fixed on its outer end and provided on one end with a dowser plate 21 adapted to swing in front of the end of cone 17 and obstruct all light passing therethrough. A latch 22 is pivoted in the other end of dowser 20 and is adapted to engage a notch 23 formed in the top of front 12 and to be held therein by a spring 24 having one end secured in latch 22 and its other end secured to a stud 25 secured in dowser 20. When the machine is in operation, dowser 20 is held out of light obstructing position but, when the device is actuated and the dowser falls, latch 22 will ride up the curved edge of front 12, strike the far side of notch 23 and be drawn therein by the action of spring 24, thus holding dowser plate 21 in front of cone 17.

Dowser 20 is held out of light obstructing position by a trip arm 27 pivoted on front 12 and having a dog 28 engaging a notch 29 formed in a collar 30 secured on shaft 19; the end of trip arm 27 extending outwardly through an opening 31 in cover 13 so that the device may be manually operated if desired. A solenoid 32 is mounted in a U-shaped support 33 secured to base 11 and spaced therefrom by spacers 34. Whenever solenoid 32 is deenergized, a plunger 35, slidably mounted in solenoid 32, will fall upon one end of a lever 36, journaled between a pair of lugs 37 formed on base 11, and cause its other end to raise trip arm 27 and release dowser 20.

Plunger 35 may be of sufficient size to accomplish this result due to its own weight or it may be assisted by a spring 38 disposed between the top of plunger 35 and the upper leg of support 33, as shown. The winding of solenoid 32 is connected in parallel with the motor of the projecting machine, as will be hereinafter described, and is energized whenever the projecting machine is in operation so that it supports plunger 35 against the force of gravity as well as against the action of spring 38 whenever same is furnished.

A switch support 40 has one end hinged on front 12 in any suitable manner as by means of a screw 41, and is adapted to be held in a position slightly inclined to the horizontal by a spring 42, having one end secured to the bearing and its other end secured to front 12, while a stop 43 formed on front 12 limits the upward movement of the free end of switch support 40. A mercury switch 44 is mounted on support 40 in any suitable manner, as by means of clips 45, and is adapted to close an electric circuit when the machine is in operation and to break the circuit and stop the machine whenever the safety device is actuated; it being understood that the device may be designed so that switch 44 will operate in the reverse manner.

An actuator 46, slidably mounted in a bearing 47 formed on front 12 and resting upon the upper side of switch support 40, is adapted to have its upper end engaged by latch 22 when dowser 20 falls so that, as spring 24 draws latch 22 into notch 23, actuator 46 will be depressed and swing the free end of switch support 40 downwardly against the action of spring 42, causing the mercury in switch 44 to flow away from the terminals of the switch and break the circuit at this point. When dowser 20 reaches the lowermost point of its swing, a dog 48 on trip arm 27 will ride into notch 29 in collar 30 and hold the dowser against movement in either direction.

After the dowser has fallen and the trouble corrected which caused the dowser to fall, latch 22 may be raised out of notch 23, which will allow mercury switch 44 to close the circuit at this point and start the motor, but dowser 20 cannot be swung out of light obstructing position until solenoid 32 is energized and withdraws plunger 35 so that the end of trip arm 27 may fall and remove dog 48 from notch 29, after which, the dowser may be swung out of light obstructing position and the unbalanced weight of trip arm 27 will move dog 28 into notch 29 and hold the dowser in this position.

Referring now to Figure 7, I have shown the motor M, which drives the projecting machine, and the automatic control apparatus as deriving their power from a power line A—B through a switch 52 which has one pole connected by a wire 53 to one side of motor M and its other pole connected by a wire 54 to one side of a relay 55 whose other side is connected by a wire 56 to the other side of motor M, thus completing the motor circuit.

One end of the winding of relay 55 is connected to wire 54 and its other end is connected to one terminal of mercury switch 44 by a wire 57, while the other terminal of switch 44 is connected to wire 53 by a wire 58 so that, when mercury switch 44 is closed, the winding of relay 55 will be energized, the relay held closed and motor M supplied with power.

A wire 59 has one end connected to wire 56 through a resistance 60 and its other end connected to a wire 61 which has one end connected to one end of the winding of solenoid 32; the other end of the winding of solenoid 32 being connected to wire 58 by a wire 62. Resistance 60 is provided in the control circuit so that a reduced amount of current is furnished switches 63, 67 and 67 and the danger of arcing, when the switches open and close, is practically eliminated.

A centrifugal switch 63 has one terminal connected to wire 61 by a wire 64 and its other terminal connected by a wire 65 to a wire 66 which has one end connected to wire 62. Two film actuated switches 67 and 67 are connected in parallel between wires 61 and 66 and consequently are in parallel with centrifugal switch 63 and solenoid 32. Centrifugal switch 63 is adapted to be connected to a rotating part of the projecting mcehanism and to remain closed until the rotating part has accelerated to a certain speed.

Assuming that switch 52 and relay 55 are closed, current will flow from the power line through wire 53, motor M, wire 56, relay 55, and wire 54, to the power line, thus providing motor M with power for operating the machine. At the same time, current will flow from wire 54, through the winding of relay 55, wire 57, switch 44, and wire 58 to wire 53, thus energizing relay 55 and holding the motor circuit closed at this point. After the projecting mechanism has accelerated to projecting speed so that switch 63 has opened, current will flow from wire 58, through wire 62, solenoid 32, wire 61, wire 59 and resistance 60 to wire 56, thus energizing solenoid 32 and allowing dowser 20 to be swung out of light obstructing position.

Switches 67 and 67 are placed above and below the projection aperture of the machine and are adapted to be closed by the film should it break, tear, jar, jam, or clog, or fail to move at an equal rate of speed over both the feed and intermittent sprockets. Should the machine slow down for any reason, such as insufficient power or trouble in the motor or in the projecting mechanism, switch 63 will close. When any one of switches 63, 67 and 67 close, a portion of the current normally flowing through solenoid 32 is shunted through the closed switch, thus depriving the solenoid of a portion of its power and allowing plunger 35 to drop against lever 36 which will raise trip arm 27 and allow dowser 20 to fall.

When the dowser falls, latch 22 will ride up the edge of front 12 until it encounters notch 23 where it will be drawn downwardly by the action of spring 24 into engagement with actuator 46, depressing same and causing mercury switch 44 to be tilted and break the circuit at this point, thus deenergizing the winding of relay 55 and breaking the motor circuit at this point. It is therefore apparent that, with one of my improved safety devices installed on a motion picture projecting machine together with the other elements forming an automatic control apparatus, all danger of the film catching fire is practically eliminated and faulty projection impossible.

Of course, the safety device illustrated may be modified in various ways without departing from the invention herein set forth and hereafter claimed.

I claim:—

1. In combination with a motion picture projecting machine, its motor, motor circuit, film and lamp, a safety device for intercepting the rays of light passing through the film including a dowser, means for holding the dowser out of light obstructing position, a switch in the motor circuit normally holding the said circuit closed, and a latch carried by said dowser for tilting said switch to open said motor circuit when said dowser falls into light obstructing position.

2. In combination with a motion picture projecting machine, its motor, motor circuit, film and lamp, a safety device for intercepting the rays of light passing through the film including a dowser, magnetic means controlling trip mechanism for holding the dowser out of light obstructing position, a tiltable switch in the motor circuit normally holding the said circuit closed, and a latch carried by said dowser for tilting said switch to open said motor circuit when said dowser falls into light obstructing position.

3. In a device of the character described having a support and a dowser, means for making and breaking an electric circuit including a mercury switch having one end hinged to the support, a spring tending to hold the switch tilted in one direction at an angle to the horizontal, and means adapted to be actuated by the dowser for tilting the switch in the opposite direction.

4. In a device of the character described having a support and a dowser, means for making and breaking an electric circuit including a mercury switch having one end hinged to the support, a spring tending to hold the free end of the switch higher than the hinged end, an actuator engaging the switch, and means carried by the dowser for engaging the actuator and depressing the free end of the switch.

5. In a device of the character described having a dowser and a support, means for making and breaking an electric circuit including a bearing having one end hinged to the support, a spring holding the bearing tilted in one direction, a mercury switch carried by the bearing, an actuator slidable in the support, and means carried by the dowser for engaging the actuator and causing same to tilt the bearing in the opposite direction.

6. A device of the character described including a support, a mercury switch hinged on the support, a spring tending to hold the switch in closed position, an actuator engaging the switch, a latch on the dowser adapted to engage the actuator when the dowser is in light obstructing position, a spring adapted to draw the latch against the actuator and open the switch, a shaft journaled in the support, a dowser on the shaft, a notched collar on the shaft, a trip pivoted on the support, a dog on the trip adapted to engage the notch and hold the dowser out of light obstructing position, a second dog on the trip adapted to engage the notch and lock the dowser in light obstructing position, a lever pivoted on the support and adapted to actuate the trip, a solenoid on the support, and a plunger in the solenoid adapted to actuate the lever, whereby the dowser will be locked in light obstructing position until the solenoid is energized and the plunger drawn away from the lever.

In testimony whereof I have signed my name to this specification.

JOHN FRANCIS ADAMS.